United States Patent
Mayer-Wegelin et al.

(10) Patent No.: US 7,926,347 B2
(45) Date of Patent: *Apr. 19, 2011

(54) METHOD AND SYSTEM FOR MONITORING A SENSOR ARRANGEMENT

(75) Inventors: Raphael Mayer-Wegelin, Friedrichsdorf (DE); Heinz-Werner Morell, Kaiserslautern (DE)

(73) Assignee: VDO Automotive AG, Regensburg (DE)

( * ) Notice: Subject to any disclaimer, the term of this patent is extended or adjusted under 35 U.S.C. 154(b) by 479 days.

This patent is subject to a terminal disclaimer.

(21) Appl. No.: 11/991,945

(22) PCT Filed: Aug. 31, 2006

(86) PCT No.: PCT/EP2006/065882
§ 371 (c)(1),
(2), (4) Date: Mar. 12, 2008

(87) PCT Pub. No.: WO2007/031409
PCT Pub. Date: Mar. 22, 2007

(65) Prior Publication Data
US 2009/0260435 A1    Oct. 22, 2009

(30) Foreign Application Priority Data
Sep. 12, 2005 (DE) .......................... 10 2005 043 559

(51) Int. Cl.
*G01C 19/56* (2006.01)
(52) U.S. Cl. .................................................. 73/504.12
(58) Field of Classification Search ............... 73/504.04, 73/504.12, 504.02, 1.37, 1.77, 56, 96
See application file for complete search history.

(56) References Cited

U.S. PATENT DOCUMENTS

| | | | | |
|---|---|---|---|---|
| 5,226,321 A | * | 7/1993 | Varnham et al. | 73/514.02 |
| 5,426,970 A | * | 6/1995 | Florida et al. | 73/1.37 |
| 5,806,364 A | | 9/1998 | Kato et al. | |
| 6,029,516 A | * | 2/2000 | Mori et al. | 73/504.12 |
| 6,282,957 B1 | * | 9/2001 | Akimoto et al. | 73/504.12 |
| 6,510,737 B1 | * | 1/2003 | Hobbs | 73/504.12 |
| 6,564,637 B1 | * | 5/2003 | Schalk et al. | 73/504.12 |
| 7,062,403 B2 | | 6/2006 | Betz et al. | |
| 7,240,533 B2 | | 7/2007 | Fell et al. | |
| 2002/0100322 A1 | | 8/2002 | Ebara et al. | |

FOREIGN PATENT DOCUMENTS

| | | |
|---|---|---|
| DE | 40 06 885 | 10/1990 |
| DE | 40 06 885 C2 | 10/1990 |
| DE | 196 53 577 B4 | 6/1995 |

(Continued)

OTHER PUBLICATIONS

Search Report dated Nov. 30, 2006 for underlying International PCT Application No. PCT/EP2006/065882.

(Continued)

*Primary Examiner* — Helen C. Kwok
(74) *Attorney, Agent, or Firm* — Cohen Pontani Lieberman & Pavane LLP

(57) ABSTRACT

A method and system for monitoring a sensor arrangement comprising a vibrating gyroscope, wherein the vibrating gyroscope is used as a resonator and forms part of at least one control circuit that excites the vibration gyroscope by feeding an excitation signal with its natural frequency. An output signal is tapable from the vibrating gyroscope from which the excitation signal is derivable by filtering and amplification.

9 Claims, 1 Drawing Sheet

FOREIGN PATENT DOCUMENTS

| | | |
|---|---|---|
| DE | 196 53 577 | 6/1997 |
| DE | 198 52 080 | 8/2000 |
| DE | 102 03 855 | 8/2002 |
| DE | 102 03 855 B4 | 8/2002 |
| DE | 102 40 087 | 3/2004 |
| DE | 102 40 087 B4 | 3/2004 |
| EP | 0 307 321 | 3/1989 |
| EP | 0 461 761 | 12/1991 |
| EP | 0 461 761 B1 | 12/1991 |
| EP | 1 600 732 A1 | 11/2005 |
| JP | 01-32113 | 2/1989 |
| JP | 09-218040 | 8/1997 |
| WO | WO 99/02942 | 1/1999 |
| WO | WO 2004/020948 A1 | 3/2004 |
| WO | WO 2005/001378 | 1/2005 |
| WO | WO 2005/001378 A1 | 1/2005 |
| WO | WO 2005/001381 | 1/2005 |
| WO | WO 2005/001381 A1 | 1/2005 |
| WO | WO 2005/075939 | 8/2005 |

OTHER PUBLICATIONS

German Office Action dated Sep. 15, 2006 issued in corresponding application No. 10 2005 043 559.9.
International Search Report dated Nov. 30, 2006 issued in corresponding application No. PCT/EP2006/065882.
International Written Opinion issued in corresponding application No. PCT/EP2006/065882.

* cited by examiner

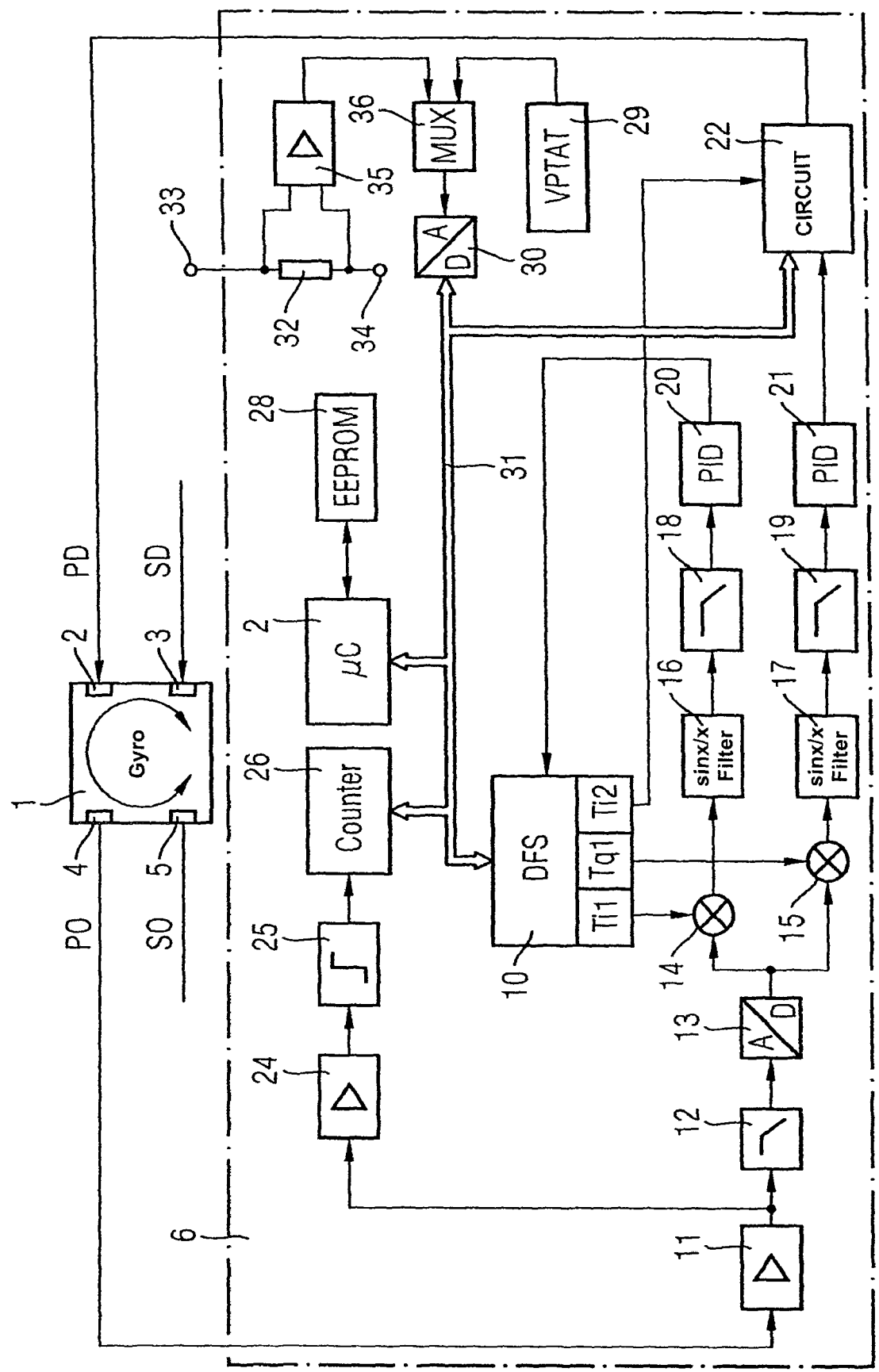

METHOD AND SYSTEM FOR MONITORING A SENSOR ARRANGEMENT

CROSS REFERENCE TO RELATED APPLICATIONS

This is a U.S. national stage of application No. PCT/EP2006/065882, filed on Aug. 31, 2006. Priority is claimed on German application No. 10 2005 043 559.9, filed Sep. 12, 2005.

BACKGROUND OF THE INVENTION

The invention relates to a method and an arrangement for monitoring a sensor arrangement comprising a vibration gyroscope which includes a resonator and is forms part of at least one control circuit which excites the vibration gyroscope by feeding an exciter signal at its natural frequency, where an output signal can be tapped off from the vibration gyroscope and the exciter signal is derived from the output signal by filtering and amplification.

For example EP 0 461 761 B1 discloses rotational speed sensors in which a vibration gyroscope is excited in two axes which are oriented radially with respect to a main axis, for which purpose a primary and a secondary control circuit are provided with corresponding transducers on the vibration gyroscope. If such rotational speed sensors are used in vehicles for stabilizing the movement of the vehicle, a fault-free function of the rotational speed sensors is an important precondition for reliable operation of the motor vehicle. For this reason, various devices and methods for monitoring and rotational speed sensors have already been disclosed, for example, by WO 2005/01378 A1, where redundant analog components and further digital components are used for monitoring.

SUMMARY OF THE INVENTION

It is an object of the present invention to improve sensor monitoring and to detect malfunctions or failures as far as possible in advance.

The object of the present invention is also to improve the monitoring and to detect malfunctions or failures as far as possible in advance.

These and other objects and advantages are achieved with the method of the invention by first calculating a first value of the change in temperature compared to the measurement from the difference between the current value of the natural frequency and a value of the natural frequency which has been previously measured during adjustment, stored in a memory and measured at a reference temperature, and from the temperature coefficient of the natural frequency. A second value of the change in temperature compared to the measurement is then+ calculated from the difference between the output variables of a temperature sensor at the current temperature and at the reference temperature stored in the memory and the temperature coefficient of the temperature sensor. In addition, the two calculated values are compared, and a fault signal is generated when there is a deviation which exceeds a predefined amount.

In relevant sensor arrangements, a temperature sensor and a microcontroller are usually present in any case so that no additional hardware expenditure is necessary to perform the method in accordance with the invention. However, the method of the invention may be implemented as a software program.

If the vibration gyroscope in a sensor arrangement is not in direct thermally conducting contact with the circuits of the sensor arrangement, the circuits generally assume a higher temperature than the vibration gyroscope during operation. Here, in order to permit a correct comparison, an embodiment of the method of the invention provides for the inclusion in the calculation of a correction temperature which takes into account thermal conditions which have changed in comparison to the adjustment of the temperature sensor.

Preferably, the correction temperature is calculated from the measured power loss of an integrated circuit which contains the temperature sensor, e.g., from the power loss which has been measured during the adjustment and stored in the memory, and from the thermal resistance of the integrated circuit with respect to the surroundings.

The invention also comprises an arrangement for monitoring a sensor arrangement comprising means to calculate a first value of a change in temperature from the difference between the current value of the natural frequency and a value of the natural frequency which has been previously measured during adjustment and stored in a memory, and from the temperature coefficient of the natural frequency, order to calculate a second value of a change in temperature from the difference between the output variables of a temperature sensor at the current temperature and at the measurement temperature, and the temperature coefficient of the temperature sensor, in order to compare the two calculated values, and to generate a fault signal when there is a deviation which exceeds a predefined amount.

BRIEF DESCRIPTION OF THE DRAWINGS

The foregoing and other advantages and features of the invention will become more apparent from the detailed description of the preferred embodiments of the invention given below with reference to the accompanying drawing in which:

The drawing shows a block diagram of a sensor arrangement comprising a vibration gyroscope with elements that serve to perform the method in accordance with the invention.

DETAILED DESCRIPTION OF THE PRESENTLY PREFERRED EMBODIMENTS

The sensor arrangement and parts thereof are illustrated as block circuit diagrams. However, it is not the intention to limit the sensor arrangement of the invention to an implementation using individual circuits which correspond to the depicted blocks. The sensor arrangement according to the invention can instead be advantageously implemented by using highly integrated circuits. This can be achieved using microprocessors which, given suitable programming, perform the processing steps illustrated in the block circuit diagrams.

With reference to the FIGURE, sensor arrangement has a vibration gyroscope 1 with two inputs 2, 3 for a primary exciter signal PD and a secondary exciter signal SD. The excitation is effected by suitable transducers, for example, electromagnetic transducers. The vibration gyroscope also has two outputs 4, 5 for a primary output signal PO and a secondary output signal SO. These signals forward the respective vibration to spatially offset locations on the gyroscope. Such gyroscopes are known, for example, from EP 0 307 321 A1 and are based on the effect of the Coriolis force.

The vibration gyroscope 1 constitutes a high quality filter in which the distance between the input 2 and the output 4 is part of a primary control circuit 6, and the distance between the input 3 and the output 5 is part of a secondary control circuit which is not illustrated since it is not necessary to explain it in order to understand the invention. The primary control circuit 6 serves to excite oscillations at the resonant frequency of the vibration gyroscope 1 of, for example, 14 kHz. Here, excitation is effected in an axis of the vibration gyroscope with respect to which the oscillation direction which is used for the secondary control circuit is offset by 90°. In the secondary control circuit (not illustrated), the signal SO is split into two components, one of which can be tapped, after suitable processing, as a signal which is proportional to the rotational speed.

In both control circuits, a significant part of the signal processing is performed digitally. The clock signals which are necessary for the signal processing are generated in a quartz-controlled, digital frequency synthesizer 10 whose clock frequency is, for example, 14.5 MHz in the example illustrated. For application of the method in accordance with the invention, the primary control circuit is essentially considered, for which reason an exemplary embodiment of the primary control circuit is illustrated in FIG. 1.

The control circuit has an amplifier 11 for the output signal PO to which an anti-alias filter 12 and an analog/digital converter 13 are connected. Multipliers 14, 15, to which carriers Ti1 and Tq1 are fed, are used to perform splitting of the output signal into an in-phase component and a quadrature component. Each of the two components subsequently passes through a (sinx/x) filter 16, 17 and a low pass filter 18, 19. The filtered real part is fed to a PID controller 20 which controls the digital frequency synthesizer. As a result, a phase control circuit which creates the correct phase angle of the carriers Ti1 and Tq1 is closed. Furthermore, a carrier Tq2 is generated and it is modulated in a circuit 22 with the output signal of a further PID controller 21 which receives the low pass-filtered imaginary part. The output signal of the circuit 22 is fed to the input 2 of the vibrating gyroscope 1 as exciter signal PD. Depending on the conditions, it is possible to provide other controllers, for example PI controllers instead of the PID controllers.

In order to implement the method in accordance with the invention, a microcontroller 27 is provided which controls the individual steps of the method and has access to a nonvolatile memory 28 which is embodied as an EEPROM. In addition, a temperature sensor which is present in many sensor circuits in any event for the method according to the invention is used, where the temperature sensor is composed of an actual sensor 29 and an analog/digital converter 30. A bus system 31 interconnects the specified components to one another, the digital frequency synthesizer 10, and to the circuit 22.

In an embodiment of the adjustment method when the sensor arrangement is manufactured, the value FORT of the natural frequency of the vibration gyroscope which was measured and the temperature at which the measurement was performed, in the form of the output voltage VRT of the temperature sensor 29, are written into the memory 28.

For the purpose of monitoring, these variables are read out from the memory 28 from time to time during operation and for comparison purposes, the variables are compared with the respectively current natural frequency, while taking into account the current temperature measured with the sensor 29 (output voltage $V_{TA}$). The comparison is based, for example, on the following equations:

$$T_{adelta1} = (F_{OTA} - F_{ORT}) / T_{CFO}$$

$$T_{adelta2} = (V_{TA} - V_{RT}) T_{Cv}$$

Here, $T_{adelta2}$ is the change in temperature which is detected using the temperature sensor, $T_{adelta1}$ is the change in temperature detected on the basis of the change in the frequency, $T_{Cv}$ is the temperature coefficient of the temperature sensor 29 which is stored in the memory, $F_{OTA}$ is the current frequency, $F_{ORT}$ is the frequency which is stored in the memory and $T_{CFO}$ is the temperature coefficient of the natural frequency of the vibration gyroscope which is likewise stored in the memory.

The current value of the natural frequency can be acquired from the respective setting of the divider of the digital frequency synthesizer 10 and its clock frequency. However, it is also possible to calculate the current value using a frequency measuring device which is composed of a further amplifier 24, a Schmitt trigger 25 and a counter 26.

In an ideal case, $T_{adelta1}$ and $T_{adelta2}$ are identical; if a difference assumes values which exceed a predefined amount, it is possible to infer that one of a plurality of possible faults is present and, for example, a fault can be signaled in the form of the activation of a warning lamp or can be stored in the memory to be available for later diagnostic purposes.

In order to take into account a loss of power to the circuit which contains at least the primary control circuit 6, which is different from the adjustment, the power drain I of the circuit is measured using a measuring resistor 32 with the value R. The operating voltage U for the circuit is fed to a connection 33 and distributed to the various components via a circuit node 34. The voltage drop $U_i$ at the measuring resistor 32 is amplified in an amplifier 35 by a factor v and fed to the analog/digital converter 30 via a multiplexer 36. The microcontroller 27 then calculates the power loss according to the equation $P = U^*I = U^*U_i/(R^*v)$. During the adjustment, the power loss $P_{RT}$ and the associated ambient temperature $T_{RT}$ are stored in the memory.

The power loss which is calculated during operation is denoted by $P_A$ in the text which follows.

It is therefore possible to calculate a correction temperature, specifically as $T_{kor} = T_{RT} + (P_A - P_{RT})^* R_{TH}$, where $R_{TH}$ signifies the thermal resistance between the circuit and the surroundings. The abovementioned equation for calculating $T_{adelta2}$ is therefore supplemented as follows:

$$T_{adelta2kor} = T_{adelta2} - T_{kor}$$

As already mentioned above, when there is a lack of identity a fault signal can be output, specifically if:

$$T_{adelta1} \approx T_{adelta2kor}.$$

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for monitoring a sensor arrangement comprising a vibration gyroscope which constitutes a resonator and forms a part of at least one control circuit which feeds an exciter signal at a natural frequency to excite the vibration gyroscope, wherein an output signal is tapable from the vibration gyroscope and the exciter signal is derived from said output signal by filtering and amplification, the method comprising:

calculating a first value of a change in temperature compared to a measurement from a difference between a current value of the natural frequency and a value of the natural frequency previously measured during an adjustment, stored in a memory and measured at a reference temperature, and from a temperature coefficient of the natural frequency;

calculating a second value of the change in temperature compared to the measurement from the difference between output variables of a temperature sensor at a current temperature, the reference temperature stored in the memory and the temperature coefficient of the temperature sensor;

comparing the first calculated value and the second calculated value; and generating a fault signal when a deviation which exceeds a predefined amount occurs.

2. The method as claimed in claim 1, further comprising:
wherein the step of comparing uses a correction temperature which takes into account thermal conditions which have changed compared to the adjustment of the temperature sensor.

3. The method as claimed in claim 2, wherein the correction temperature is calculated from a measured power loss of an integrated circuit which contains the temperature sensor, the power loss which has been measured during the adjustment and stored in the memory and from a thermal resistance of the integrated circuit with respect to surroundings of the temperature sensor.

4. An arrangement for monitoring a sensor arrangement comprising:
a vibration gyroscope which constitutes a resonator and forms part of at least one control circuit which feeds an exciter signal at a natural frequency to excite the vibration gyroscope, an output signal being tapable from the vibration gyroscope and the exciter signal being derived from said output signal by filtering and amplification; and means for calculating a first value of a change in temperature compared to a measurement from a difference between a current value of the natural frequency and a value of the natural frequency previously measured during an adjustment, stored in a memory and measured at a reference temperature, and from a temperature coefficient of the natural frequency, for calculating a second value of the change in temperature compared to the measurement from the difference between output variables of a temperature sensor at a current temperature, the reference temperature stored in the memory and the temperature coefficient of the temperature sensor, for comparing the first calculated value and the second calculated value, and for generating a fault signal when a deviation which exceeds a predefined amount occurs.

5. The arrangement as claimed in claim 4, wherein the means comprise a microcontroller with a nonvolatile memory.

6. The arrangement as claimed in claim 4, further comprising:
means for using a correction temperature in the comparison which takes into account thermal conditions which have changed compared in comparison to the adjustment of the temperature sensor.

7. The arrangement as claimed in claim 5, further comprising:
means for including a correction temperature in the calculation for taking into account thermal conditions which have changed compared in comparison to the adjustment of the temperature sensor.

8. The arrangement as claimed in claim 6, further comprising:
means for calculating the correction temperature from a measured power loss of an integrated circuit which contains the temperature sensor, from the power loss which has been measured during the adjustment and stored in the memory and from a thermal resistance of the integrated circuit with respect to surroundings of the temperature sensor.

9. The arrangement as claimed in claim 4, further comprising:
means for determining the current value from a respective setting of a divider of a digital frequency synthesizer and a clock frequency of the frequency synthesizer.

* * * * *